United States Patent

[11] 3,627,970

| [72] | Inventors | John F. Weatherman<br>Santa Ana;<br>Gary J. Walker, La Crescenta; Larry R. Conley, Simi, all of Calif. |
|------|-----------|---|
| [21] | Appl. No. | 857,258 |
| [22] | Filed | July 28, 1969 |
| [45] | Patented | Dec. 14, 1971 |
| [73] | Assignee | Micro-Technology, a division of Sterling Electronics Corporation<br>Westlake Village, Calif. |

[54] METHOD FOR WELDING A CONDUCTOR THROUGH COLD FLOWABLE INSULATION
19 Claims, 11 Drawing Figs.

[52] U.S. Cl. ........................................... 219/91, 219/92
[51] Int. Cl. ......................................... B23k 9/28, B23k 11/10
[50] Field of Search .......................... 219/91, 92, 83, 104, 117

[56] References Cited
UNITED STATES PATENTS

| 2,113,664 | 4/1938 | Simmie | 219/91 X |
| 3,252,203 | 5/1966 | Alberts et al. | 219/92 X |

*Primary Examiner*—J. V. Truhe
*Assistant Examiner*—Hugh D. Jaeger
*Attorney*—Christie, Parker & Hale

ABSTRACT: A conductor, surrounded with cold flowable insulation, is welded to a terminal pin, e.g., by engaging the conductor and the pin between a pair of unheated welding electrodes. The electrodes are urged together with a force which reaches a value greater than a desired welding force value and is sufficient to cause the insulation to undergo cold flow out of a path between the electrodes via the conductor and the pin, thereby to render the path conductive. The force applied to the electrodes is then decreased to the desired welding force value and a pulse of welding current is passed along the conductive path when the desired force value is achieved. The current pulse is applied as the force applied to the electrodes decreases and is completed, and the molten metal formed by the current pulse is solidified, before such force is completely removed. The conductor is supplied through a passage formed in one of the electrodes.

METHOD FOR WELDING A CONDUCTOR THROUGH COLD FLOWABLE INSULATION

BACKGROUND OF THE INVENTION

1. Field of the Invention

This invention pertains to method and apparatus for welding conductors and the like to terminal pins or circuit components in the fabrication of electrical networks and electronic circuits.

2. Review of the Prior Art

Resistance welding has been used for some time in the manufacture of precision electronic devices to conductively connect and mechanically secure conductors to terminal pins on printed circuit boards, to terminal pins of electrical connectors, and to electronic components, components, for example.

Most prior welding techniques and machines were developed before the recent emphasis upon compactness and small size of electrical components and circuits, and at a time when labor costs were lower. With the advent of smaller circuit assemblies and components, conductor sizes have decreased to such a point that it is critical that the connection of a conductor to a terminal pin be made effectively upon the first attempt; conductors, particularly the conductors extended from semiconductor-integrated circuit units, are now so small in diameter that if a weldment of a conductor to a terminal pin is not initially completed properly, the conductor may be severed so that the weldment cannot be remade. Also, even if the conductor is not severed in making a defective weldment, labor costs are now at such a level that location and repair of defective weldments is often too expensive to be commercially feasible. These factors make it highly desirable that the connection weldment be made efficiently, effectively and reliably upon the first attempt. Once the conditions necessary to the making of reliable welds have been established, repeatably effective welds can be produced only by the use of highly skilled personnel, or by the use of equipment which assures that the desired conditions are present during the welding process. Prior welding techniques and equipment do not adequately produce repeatable welds when applied to current circuit arrangements and production requirements.

U.S. Pat. No. 3,252,203 describes a method for connecting, by welding, a conductor surrounded by a cold flowable insulating material to a circuit board terminal pin. This method requires that both welding electrodes be located adjacent the same side of the circuit board. Such arrangement is subject to the problem that the disposition of the components of the circuit defined on the board, or of other conductors and terminal pins, may restrict access to the conductor and terminal pin of interest or may be damaged as the board is manipulated to place the conductor and terminal pin of interest in the proper relation to the electrodes. As a corollary, this arrangement places practical limits upon the proximity which one terminal pin may have to other terminal pins. Also, the structural arrangement required to practice the method of this patent is such as to restrict ready visual observation of the conductor and terminal pin being connected, and to require precise positioning of the conductor and terminal pin relative to the specially configured electrodes. As a result, the method described in U.S. Pat. No. 3,252,203 is not well suited to use by relatively unskilled personnel in making many welds of highly repeatable nature and high quality in a short time.

U.S. Pat. No. 2,977,672 also describes pressure induced cold flow of insulation out of the way between a pair of conductors prior to the making of an weld in the area of physical contact between the conductors. The structure described in this patent is arranged so that the problems of restriction of field of view are not present as in the structure contemplated by U.S. Pat. No. 3,252,203. U.S. Pat. No. 2,977,672, however, describes structure in which the forces applied to the conductors during the welding process are subject to control completely by a human operator. Thus, welds produced by use of such structure are not of repeatably high quality as required by present commercial and military acceptability criteria.

Several other welding methods are also known. For example, U.S. Pat. No. 3,155,809 describes a welding method and device in which heated welding electrodes are forcefully engaged with the elements to be welded to soften and displace heat-softenable insulation from the path between the electrodes via such elements. Where such apparatus is used with fine conductors having thin insulator coatings, undesired contact of the electrodes with the conductor may lead to removal of insulation in troublesome locations and result in rejection of the finished product.

Other problems of these and other welding methods and devices are discussed below.

SUMMARY OF THE INVENTION

The present invention provides novel method and apparatus for effectively welding through insulation to connect an insulated conductor to another conductive element such as another conductor or a terminal pin on a circuit board or the like. The method involves practices and procedures which are contrary to previously known recommended welding practice and procedure to produce welds of higher basic strength than was previously possible. Also, such departures from recommended practice and procedure make it possible to use combinations of electrode and conductor materials which were not previously workable. The apparatus produces highly repeatable welding conditions and eliminates human interference and discretion from the welding process. As a result, the apparatus is usable by relatively unskilled personnel to provide, in precision electronic components and circuits, welds of high strength and quality rapidly and with a high degree of repeatability.

The present invention makes it possible to provide direct point-to-point connections in printed circuit configurations and in wiring arrays in which wire wrap techniques were previously used. In printed circuit technology, point-to-point connection is often impossible because of intervening conductors the presence of which require that a given conductor go around the intervening conductor. In wire wrap techniques, the mass of wires already in place on the circuit board may make it impossible to go directly from one terminal to another. In the practice of the present method, it is possible to provide straight line conductive paths to an extent not heretofore practicable.

Briefly stated, this invention provides a method of forming, by welding, a conductive mechanical connection between a conductor surrounded by a pressure-deformable insulating material and a desired conductive element. First, the insulated conductor and the element are engaged with each other under the bias of a force which is sufficient to produce cold flow of the insulating material from between the conductor and the element, such force being greater than a predetermined welding force value appropriate to the production of a sound weld of the conductor to the element. The force with which the conductor and the element are engaged is then reduced to the predetermined welding force value, and a weld is formed between the conductor and the element when the predetermined welding force value is achieved.

As to apparatus, a pair of substantially aligned welding electrodes are coupled in a series circuit, via a control switch, to a suitable source of welding current. The electrodes are relatively movable along their axis of alignment. Power means are connected to the electrodes for biasing the electrodes toward each other with increasing and then decreasing force, which force increases from and decreases to zero magnitude. The maximum force applicable to the electrodes by the power means substantially exceeds a predetermined welding value associated with the production of a weldment of interest. The control switch is coupled to the electrodes to complete the circuit when the force applied to the electrodes equals or is less than the predetermined welding force value.

Means are provided the disable circuit-completing operation of the control switch during operation of the power means to increase the force applied to the welding electrodes.

TERMINOLOGY

In the following description of the invention, as well as in the appended claims, the terms and phrases set forth below shall be understood to have the meanings set forth unless the context wherein such terms and phrases are used clearly indicates otherwise. These definitions are set forth at this point so that the following description and the language of the claims may be simplified.

1. "The work" consists of the two items which are to be welded together. In the examples illustrated and described hereinafter, the work consists of an insulated conductor and a terminal pin mounted to a circuit board. The circuit board may be a conventional organic resin impregnated paper, or equivalent, circuit board, or it may be a ceramic circuit board having through terminal pins fired as by sintering into the ceramic material. The insulated conductor may be a round wire surrounded by a sheath of insulating material, or it may be a flat metal strip embedded in or carried on a sheet of insulating material. Within the meaning of the work as used herein, the terminal pin may be replaced by an insulated conductor or an uninsulated conductor, for example.

2. A "weld schedule" is a description, usually in graphical form, of the relation between applied force and welding power (normally expressed in watt-seconds) necessary to produce an acceptable weld between two specified conductive items by the use of a specified welding machine or type of welding machine. The weld schedule is presented with respect to welding electrodes of specified shape and composition. A weld schedule is normally obtained by making several test welds upon the desired work and by analyzing the welds for structural and metallurgical integrity. Those welds found to be acceptable are used to define, on a graph in which applied force is plotted against welding power, a zone within which lie the combinations of applied power and force which may be used to produce acceptable welds.

3. "Predetermined welding force value" is the applied force value which corresponds to or closely approximates the optimum applied force within the zone of acceptability defined by the weld schedule pertinent to the work and the welding apparatus of interest.

DESCRIPTION OF THE DRAWINGS

The above-mentioned and other features of the invention are more fully set forth in the following detailed description of a presently preferred embodiment of the invention, which description is presented with reference to the accompanying drawings, wherein.

DESCRIPTION OF THE PREFERRED EMBODIMENT

Figure 8:
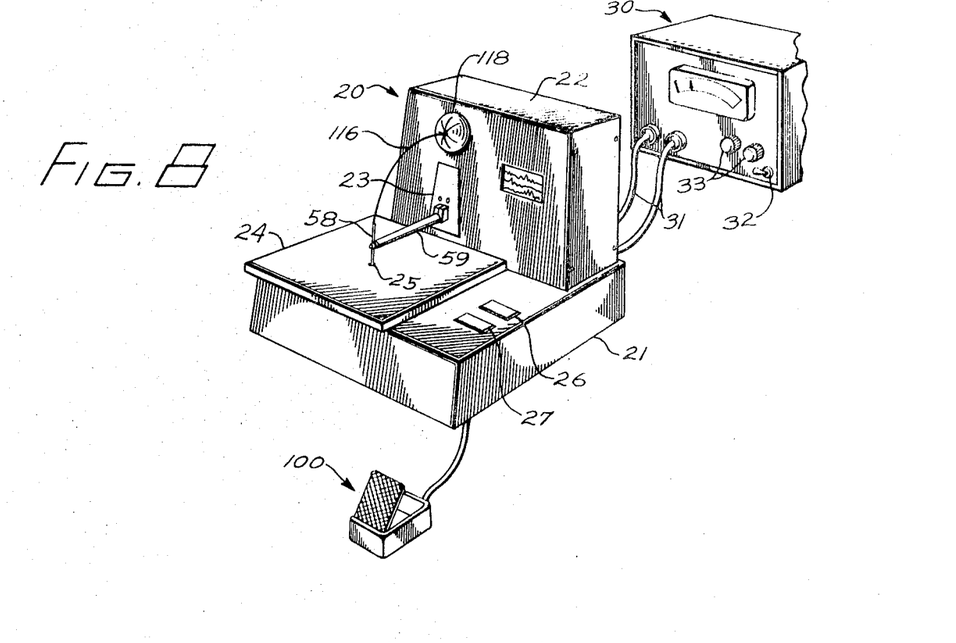
FIG. 8 is a perspective view of a welding machine according to this invention.

FIG. 8 shows a resistance welding machine 20 which is a presently preferred embodiment of apparatus for practicing the improved welding method taught by this invention. The welding machine includes a boxlike, generally horizontal base 21, and a housing 22 for a resistance welding head 23. Housing 22 extends upwardly from the rear portion of base 21 which also mounts a horizontal work support table 24 having a central aperture 25. The base also incorporates an ON/OFF switch 26 for the welding machine, and a cycle switch 27.

The welding machine, as shown in FIG. 8, is used in combination with a resistance welding power supply 30, the output of which is connected to the input terminals (not shown) of welding head 23 by suitable cables 31. The power supply includes its own ON/OFF switch 32 and such additional controls 33 as are necessary. The power supply as such forms no part of this invention and may be any suitable commercially available resistance welding power supply. It has been found that a Model 1–049–03 power supply, available from Unitek Corporation, Monrovia, California, or equivalent, may be used to good advantage with the welding machine shown in FIG. 8 and described in greater detail below.

Figure 1:
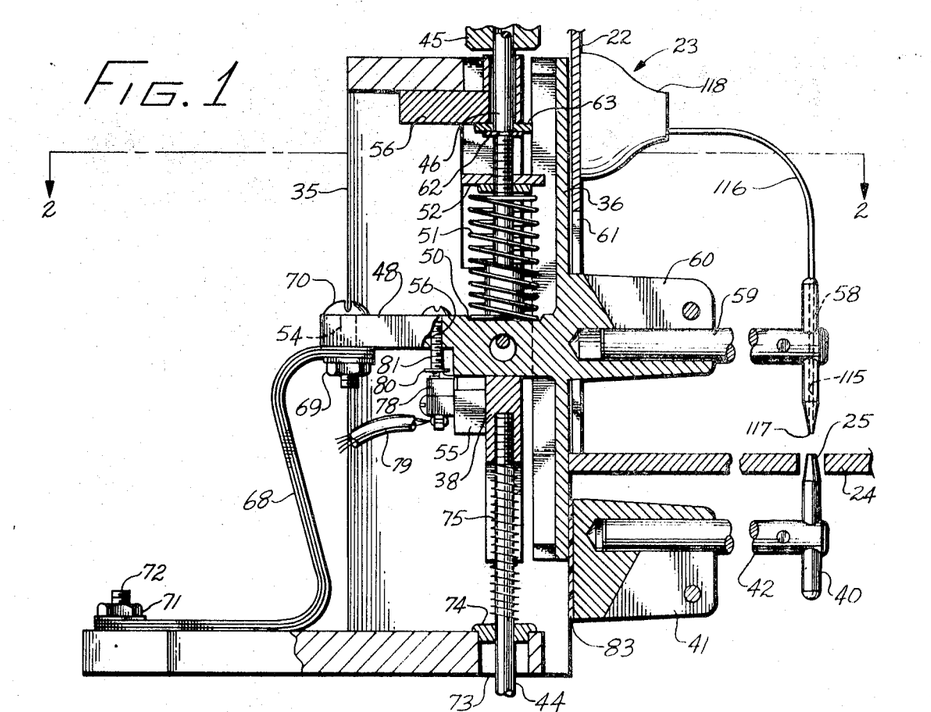
FIG. 1 is a cross-sectional elevation view of a resistance-welding head which constitutes a portion of a welding machine according to this invention.
Figure 2:
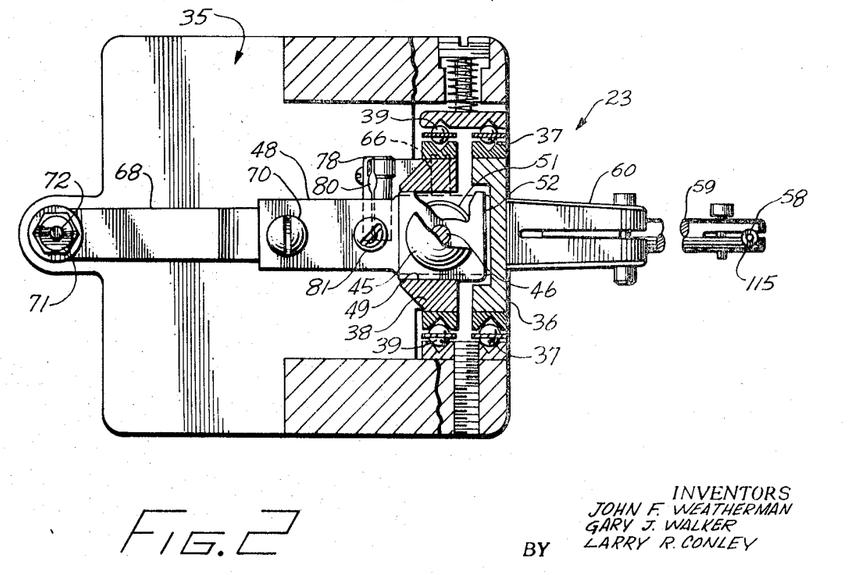
FIG. 2 is a cross-sectional plan view taken along line 2—2 of FIG. 1.

As shown in FIGS. 1 and 2, welding head 23 includes a base 35 which is securely attached to the base of welding machine 20 within housing 22 to the rear of work support table 24. The welding head also includes a carrier slide 36 which is mounted to base 35 by antifriction means such as ball bearings 37 for only vertical motion relative to the base. The resistance welding head further includes a drive slide 38 which is similarly mounted for movement only linearly in a vertical direction relative to base 35; drive slide 38 is supported for such movement by suitable antifriction means such as ball bearings 39. Slides 36 and 38, therefore, may move freely in linear reciprocal motion relative to base 35 and relative to a lower welding electrode 40 supported in an electrode holder horn 42 which is mounted to base 35. Electrode 40 is engaged in the unsupported end of horn 42 which extends in cantilever fashion forwardly from an electrode arm 41 which is rigidly mounted to base 35 via electrical insulation 83 under work support table 24 in the base of welding machine 20. The upper portion of electrode 40 extends through aperture 25 in work support table 24 and has a frustoconical configuration.

A drive slide rod 44 is connected to drive slide 38 and extends downwardly through base 35 to power means 85 (see FIGS. 4 and 5 and the following description relative thereto) which is operable to provide a displacing force for moving the carrier and drive slides reciprocally relative to base 35 and electrode 40. A relative motion force adjusting knob 45 is connected to a relative motion force adjusting shaft 46 extending through base 35 from the upper extent of the drive slide.

As shown in FIG. 1, carrier slide 36 defines a tongue 48 which projects rearwardly through a central aperture 49 (FIG. 2) in the drive slide. The upper surface of tongue 48, within aperture 49, defines a spring seat 50 for receiving the lower end of a compression spring 51, the other end of which is engaged with a nut 52 which is threadably engaged with force-adjusting shaft 46 and which cooperates within aperture 49 so as to be constrained from angular movement relative to drive slide 38. Spring 51 is disposed circumferentially of the lower end of shaft 46. A retainer ring 62 is engaged circumferentially of force-adjusting shaft 46 just below the upper extent of aperture 49 so as to be secure from movement axially of the shaft. A washer 63 is engaged between the retainer ring and the drive slide to prevent spring 51 from moving shaft 46 upwardly relative to the drive slide. Knob 45, therefore, is rotatable to vary the compressive bias programmed into spring 51 thereby to adjust the force which must be applied upwardly to the carrier slide to drive the carrier slide upwardly relative to drive slide 38.

Carrier slide tongue 48 has a first threaded bore 53 through it rearwardly, i.e., to the left in FIG. 1, of spring 51. A second threaded bore 54 extends through the rear end of the tongue. The drive slide defines a switch-mounting lug 55 immediately below drive slide aperture 49, and a stop lug 56 adjacent the opposite extremity of aperture 49. The stop lug, as shown in FIG. 1, cooperates with base 35 to limit the upward movement of the drive slide relative to the base. The carrier slide travels with the drive slide relative to base 35 except when the carrier slide is driven relative to the drive slide against the bias of spring 51. It is apparent that lug 56 also defines the normal or at-rest position of a second electrode 58 which is carried in the unsupported end of a holder horn 59. Horn 59 extends forwardly from an electrode support arm 60 defined by the carrier slide forwardly of tongue 48. Electrode holder horns 42 and 59 are of such length that electrodes 40 and 58 are essentially coaxially aligned with each other. As shown in FIG. 1, electrode support arm 60 projects from the carrier slide through an aperture 61 formed in the front face of welding machine housing 22 above work support table 24.

A horizontal bore 65 is formed through the carrier slide centrally below spring seat 50. A pin 66, having a diameter substantially smaller than the diameter of bore 65, extends through the bore and has its opposite ends secured to drive slide 38.

A grounding strap 68 has one end secured to carrier slide tongue 48 by means of a nut 69 and a bolt 70 which cooperate with bore 54. The other end of the grounding strap is secured to welding head base 35 by a nut 71 and a bolt 72.

Drive slide rod 44 passes from power means 85 to the drive slide through an aperture 73 formed in base 35 and which is fitted with a retaining washer 74. A compression spring 75 is disposed circumferentially of the drive slide rod between the drive slide and washer 74 to bias the drive slide upwardly relative to the welding head base. Spring 75 urges the drive slide into its upper limit of motion relative to base 35, at which upper limit stop lug 56 is engaged with the base as shown in FIG. 1.

Since spring 51 acts to urge the carrier slide downwardly relative to the drive slide, pin 66 is normally engaged with the upper extremity of bore 65, as shown in FIG. 1. In use of the welding head, however, as will be made clear from the following description, the drive slide is driven downwardly relative to base 35 by operation of power means 85 to which drive slide rod 44 is connected. If, during movement of the drive slide downwardly relative to the base, electrode 58 should engage the work to be welded together, the carrier slide will encounter resistance to movement with the drive slide downwardly relative to base 35. This resistance to continued downward movement of the carrier slide works against the bias imposed upon the carrier slide by spring 51. Depending upon the force applied to upper electrode 58 by the work, and upon the bias applied by spring 51 to the carrier slide, the carrier slide will ultimately become stationary relative to base 35 as downward movement of the drive slide continues. The bias programmed into spring 51, therefore, determines the amount of force which must be applied to electrode 58 to cause the carrier slide to cease moving downwardly with the drive slide during operation of the power means. Spring 51 also determines the rate at which force is further applied to the work held between the adjacent ends of electrodes 40 and 58 during further downward movement of the drive slide.

The difference in the diameter between bore 65 and pin 66 determines the maximum amount of movement of the carrier slide upwardly relative to the drive slide during operation of the power means. Since upward movement of the carrier slide relative to the drive slide produces deflection of spring 51, it is apparent that the maximum force applicable by spring 51 to electrode 58 relative to electrode 40 is determined by the stiffness of spring 51 and its initial state of deflection in the illustrated at-rest condition of the welding head. That is, with respect to FIG. 10 (the same being a graphical representation of the relationship of the force applied by electrodes 40 and 58 to work disposed between them during the time required for operation of the power means shown in FIGS. 3 and 4 through one cycle), the stiffness of spring 51 determines the slope of curve 77, and the difference in diameter between bore 65 and pin 66 is correlatable to the maximum value of the peak of the curve for a given spring 51 and the initial bias state of such spring. In practice, however, it is preferred that pin 66 not engage the lower extremity of bore 65.

A normally closed limit switch 78 is mounted on switch-mounting block 55 of drive slide 38 and has a pair of leads 79 extending from the switch. Switch 78 has a switch arm 80 which cooperates with a setscrew 81 engaged in threaded bore 56 of carrier slide tongue 48. Switch 78, therefore, is sensitive to movement of carrier slide 36 upwardly relative to drive slide 38. Since upward movement of the carrier slide relative to the drive slide produces deflection of spring 51, and the deflection of spring 51 determines the force which is applied by electrode 58 to work held between electrode 58 and electrode 40, it follows that switch 78 is sensitive to the force applied by the electrodes to work engaged between them. The contacts of switch 78 are closed and remain closed until the force exerted by spring 51 upon carrier slide 16 exceeds a value which is predetermined by the setting of setscrew 81 relative to the carrier slide, and by the stiffness and initial bias of spring 51. During downward movement of drive slide rod 44 in response to operation of the power means, the contacts of switch 78 remain closed until the predetermined force value has been reached, at which time the force open and remain open until the predetermined shown in value is again reached on the upstroke of rod 44. It will be apparent from the foregoing description that downward movement of rod 44 relative to base 35 produces increasing force between the electrodes, and upward movement of the rod relative to the welding head base corresponds to decreasing force between the electrodes.

Switch 78 is disposed in series relation between electrodes 58 and 40 and the output of resistance welding power supply 30. An additional switch 92, forming a part of power means 85, is also placed in series with switch 78 between the electrodes and the power supply to disable effective coupling of the power supply to the electrodes on a downstroke of drive slide rod 44.

Except with respect to switch 78, the foregoing description of resistance welding head 23 pertains to existing resistance welding heads. Welding machine 30, however, is a portion of this invention and, to the extent that the welding head constitutes a component of the welding machine, to such extent the welding head is a constituent of the structural aspects of this invention. Any suitable commercially available welding head having the operational characteristics of the welding head described above may be used to advantage in welding machine 20. At the present time, it is preferred that a Model 2-032-03 resistance welding head available from Unitek Corporation, Monrovia, California be used as a component of the welding machine. In this regard, it is important to note that a Unitek Model 2-032-03 resistance welding head incorporates a normally open switch in the place of normally closed switch 78 described above. This modification is germane to the present invention, and the significance of such modification will be apparent from the following description.

Lower electrode arm 41 is insulated from base 35 by insulation 83. Welding current is supplied to electrode arm 41 via a suitable conductor (not shown), the energization of which is controlled by switch 78 and switch 92. Similarly, the carrier slide, which is placed out of conductive contact with housing 22 of welding machine 20, is connected by a suitable conductor (not shown) to the power supply via cable 31.

Figure 3:
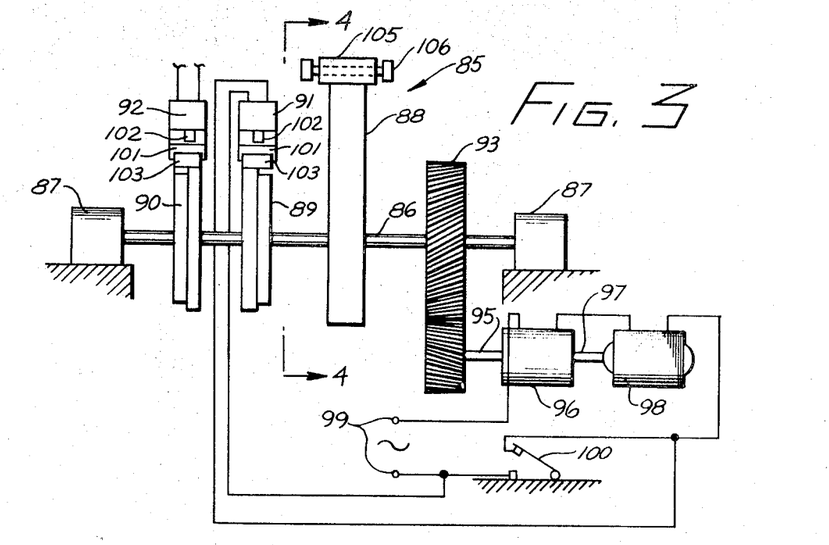
FIG. 3 is an illustration of the drive means provided to automatically operate the welding head shown in FIGS. 1 and 2.
Figures 4, 5, 6:
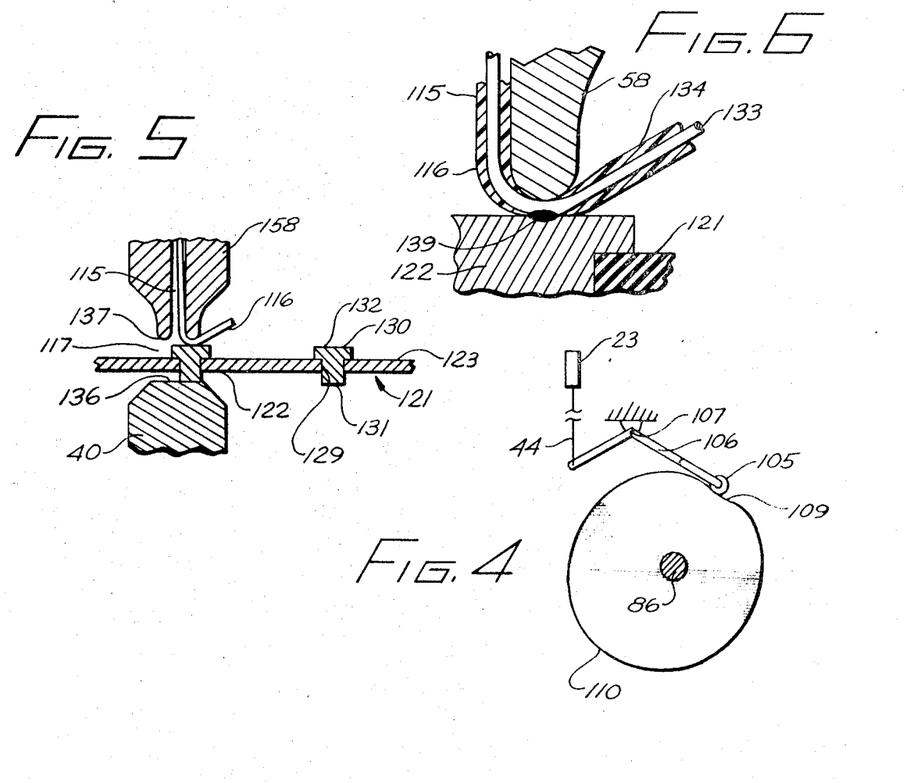
FIG. 4 is a cross-sectional view taken along line 4—4 in FIG. 3.
FIG. 5 is an enlarged cross-sectional elevation view of the welding electrodes, an insulated conductor, and a circuit board in the relation of such elements during the making of a weld pursuant to the method of this invention.
FIG. 6 is an enlarged cross-sectional elevation view of a portion of the illustration of FIG. 5.

FIGS. 3 and 4 illustrate power means 85 to which welding head 23 is coupled via drive slide rod 44. The power means includes a shaft 86 which is supported for rotation in stationary bearings 87. A control cam 88 and two switch-operating cams 89 and 90 are secured to shaft 86. A pair of microswitches 91 and 92 cooperate with cams 89 and 90, respectively. Shaft 86 also carries a gear 93 which cooperates with a pinion gear 94 carried by the output shaft 95 of an electromagnetic clutch 96. The input shaft 97 to the clutch is the output shaft of an electric motor 98. Motor 98 and clutch 96 are coupled in series across a pair of power means energization terminals 99 via a foot-operated switch 100. Closure of switch 100 energizes both clutch 96, to couple shafts 97 and 95, and motor 98. Switch 91 is coupled in parallel with switch 100 and is a normally open switch which, because of the profile of cam 89, is closed promptly upon the first increment of rotation of shaft 86 and remains closed until just before shaft 86 has completed one full rotation from its base position. Each of switches 91 and 92 includes a resiliently biased switch arm 101 which extends in cantilever fashion past a switch-actuating plunger 102 and carries a cam follower roller 103 at its unsupported end.

As shown best in FIG. 4, a cam follower roller 105 is rotatably mounted to a bifurcated end of a bellcrank 106 for cooperation with the periphery of control cam 88. The bellcrank is pivoted intermediate its ends to a stationary fulcrum 107. The end of the bellcrank opposite from cam follower roller 105 is connected to the lower end of drive slide rod 44 of resistance welding head 23. Cam 88 has a rest portion 109 in its periphery along which the radius of the cam from shaft 86 is least. Cam rest portion 109 corresponds to the at-rest position of the structure of the welding head and, when follower roller 105 is engaged with cam rest portion 109, the structure of the welding head is in the state shown in FIG. 1. The cam also has a control lobe 110 extending over the major portion of the remainder of the periphery of the cam, the variation of the radius of the cam from the smallest diameter thereof being essentially sinusoidal in nature over the extent of the cam control lobe. Thus, the profile of cam 88 along control lobe 110 determines the character of curve 77 in FIG. 10. The beginning of the control lobe corresponds to the origin of the graphical representation in FIG. 10, and the end of the lobe corresponds to the point at which curve 77 returns to the $F=0$ ordinate in such graphical representation.

Figure 10:
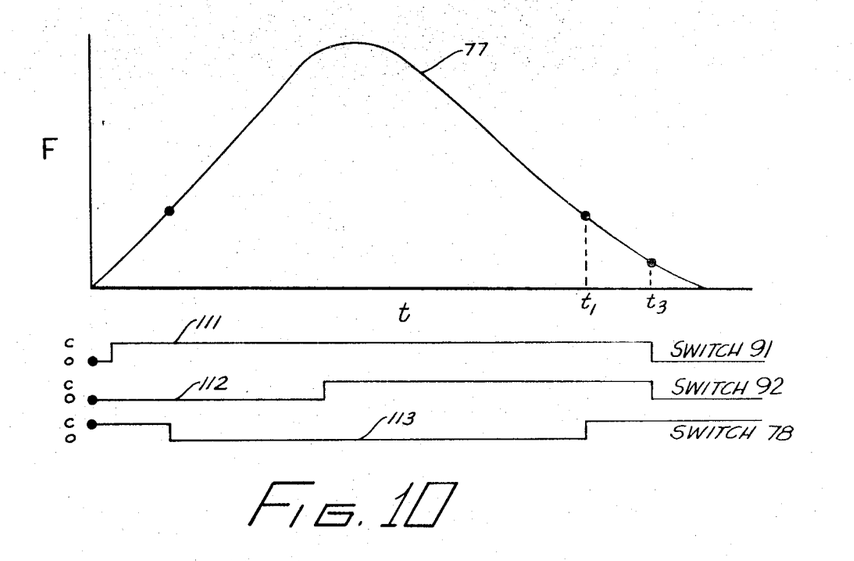
FIG. 10 is a graphic illustration of the relation between electrode force and time during operation of the machine shown in FIG. 8 to perform the present method.

In FIG. 10, curve 111 describes the condition of motor control switch 91 throughout one full cycle of the operation of the welding machine; one full cycle of the welding machine corresponds to one full rotation of shaft 86. Switch 92 of power means 85 is an inhibit switch which is connected in series with switch 78 in welding head 23, and curve 112 of FIG. 10 describes the operation of this switch during one cycle of operation of the welding machine. Curve 113 in FIG. 10 describes the operation of switch 78 in the welding head. Curve 111 illustrates that switch 91 closes momentarily after operation of switch 100 to maintain energization of motor 98 after the operator of welding machine 20 removes his foot from switch 100. Curve 112 illustrates that cam 90 and cam 88 are phased relative to each other on shaft 86 so that switch 92 closes at about the time that electrodes 40 and 58 exert maximum force upon the work engaged between the electrode tips, thereby enabling switch 78 to trigger the firing of a pulse of welding current from power supply 30 through the electrodes at the time a predetermined welding force value (programmed into the welding head by the adjustment of setscrew 81, and by the character and adjustment of spring 51) exists between the electrodes.

FIGS. 1 and 2, and particularly FIG. 5, illustrate that upper electrode 58 is axially hollow to define a vertical passage 115 through which an insulated conductor 116 is fed to the gap 117 which exists between the electrodes from a conductor supply spool 118. As shown in FIGS. 1 and 8, the conductor supply spool is mounted to welding machine housing 22 above the location at which upper electrode holder horn 59 projects from the welding head.

Figure 9:
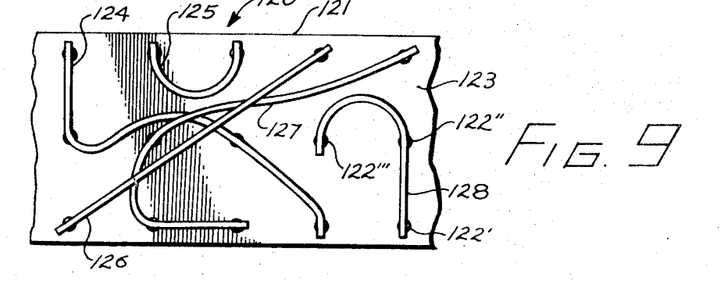
FIG. 9 is a fragmentary plan view of a portion of a circuit board to which conductors have been secured by the present welding method.

FIG. 9 illustrates an exemplary electrical component 120 in the fabrication of which the method and apparatus of this invention are used to advantage. Component 120 may be a printed circuit board 121 through which a plurality of conductive terminal pins 122 are fitted at desired locations on the circuit board. The surface of the board which is visible in FIG. 9 may be regarded as the reverse surface 123 of the board, the obverse surface of the board carrying a pattern of conductive traces and selected circuit components such as resistors, capacitors, and the like. It may be desired to interconnect various terminal pins by conductors 124, 125, 126, 127, and 128 in a predetermined manner across the reverse side of the circuit board. The method and apparatus of this invention allows these conductors to be welded to terminal pins 122 rapidly and effectively without the need of stripping insulation from the conductor stock material. (Conductors 124–128 are defined by pieces of conductor 116 which is sometimes referred to as the stock conductor or the conductor stock material.) In effect, conductors 124–128 are stitched to the terminal pins in the desired pattern by a procedure which is both efficient and reliable As shown in FIG. 5, terminal pins 122 are fitted in corresponding apertures 129 defined at desired locations in circuit board 121. Each terminal pin has an upper surface 130 disposed adjacent the circuit board reverse surface, and a lower end surface 131. FIG. 5 illustrates that the upper ends of the terminal pins define an enlarged head 132 but this feature of the terminal pins is not required for successful practice of the method of this invention. All that is desired is that the pins be configured so that they are secure within the desired apertures of the circuit board. Also, and this is important, it is desired that terminal pins 122 be uniform in length between opposite end surfaces 130 and 131. It is not necessary that terminal pin upper end surfaces 130, for example, be uniformly spaced from board surface 123. For emphasis, all that is necessary is that the pins be of uniform and known length between their end surfaces; the reason for the significance of this characteristic of the terminal pins will be explained in greater detail below.

In FIG. 6, which is an enlargement of a portion of the illustration of FIG. 5, conductor 116 is fed down upper electrode passage 115 from conductor supply spool 118 and has a core defined by a length of conductive wire 133 of suitable diameter. The wire is surrounded along the length of the conductor by a sheath of electrical insulating material 134.

In order that conductors 124–128 may be secured to terminal pins 122 in the arrangement shown in FIG. 9 without stripping the insulation from the conductor stock material, it is important to the practice of the method of this invention that insulating material 134 be cold flowable under applied pressure. That is, insulator material 134 should have the property that when pressure is applied to the material, the material deforms and tends to flow laterally from the point of greatest pressure. The specific cold-flowable insulating material utilized in a conductor contemplated by this invention is not critical. Suitable insulating materials may be provided by fluoroethylene propylene, tetrafluoroethylene, or nylon. As a practical matter, however, the insulating material should not be readily cold-flowable under relative low values of pressure because, if such is the case, the insulation may open in the completed component in response to localized pressures which may be experienced by the conductor in use of the component.

As shown in FIG. 5, the upper end of lower electrode 40 defines a flat surface 136 which is disposed normal to the elongate extent of the electrode; i.e., surface 136 is disposed perpendicular to the axis of alignment of the electrodes, such axis being the same line along which electrode 58 is movable toward and away from stationary electrode 40. The lower end of electrode 58 is smoothly curved as at 137 circumferentially of the opening defined at the lower end of conductor passage 115. Preferably, the outer diameter of electrode 58 at its extreme lower end is less than the diameter of the electrode along the major portion of its length. The reduction in the diameter of the electrode at its lower end provides for concentration of the force developed between the electrode by operation of power means 85 to a localized small area of conductor 116, and also makes it easier for an operator of machine 20 to clearly observe the relationship of conductor 116 and a desired terminal pin 122 during the formation of a weld between wire 133 and terminal pin 122, as shown in FIG. 6.

Before proceeding further with an explanation of the operation of welding machine 20, the novel welding method provided by this invention is described briefly. As shown in the drawings, the welding method is practiced to weld a conductor 133 surrounded by a cold-flowable insulating material 134 to a circuit board terminal pin 122. First, the unprepared insulated conductor and the conductive element to which the conductor is to be secured are engaged with each other under the influence of a force which is (1) sufficient to produce cold flow of the insulating material from between the conductor and conductive element, and (2) greater than the predetermined welding force value defined by the weld schedule for the work and electrodes under consideration. Next, the force with which the conductor and the element are engaged is reduced to the predetermined welding force value. Preferably, the reduction in the force applied to the work is reduced from the maximum value of the force to the selected welding force value sufficiently rapidly that the cold-flowable insulating material surrounding the conductor does not have an opportunity to flow back into the path between the electrodes through the work, which path was rendered conductive by the practice of the first step of the method. Once the force applied to the work is reduced to the selected welding force value, a pulse of welding current is passed through the electrodes to produce the desired weld. The power of the pulse of welding current will be in accord with the weld schedule applicable to the work under consideration. The welding current pulse may be, and preferably is, passed through the work at a time when the force applied to the work by the electrodes is decreasing; this aspect of the present method constitutes a radical departure from previously recommended welding practice and procedure.

With the foregoing summary of the method of this invention in mind, the operation of welding machine 20 to produce the product shown in FIG. 9 should be apparent. Assume that the first stage in the production of component 120 is to connect conductor 128 to terminal pins 122', 122'' and 122'''. Circuit board 121 is disposed on work support surface 25 of the welding machine with surface 123 disposed upward. Board 121 is positioned so that terminal pin 122' is located over hole 25 and has its lower end 131 engaged with the flat surface 136 defined at the upper end of lower electrode 40. At the time the circuit board is so disposed on the work support surface, the upper electrode is retracted from the lower electrode and the structure of welding head 23 is in the state shown in FIG. 1. When the operator of machine 20 determines visually that terminal pin 122 is suitably disposed on electrode 40, foot switch 100 is operated to activate power means 85. It will be seen that operation of switch 100 causes motor 98 to become effective via gears 93 and 94 to rotate shaft 86 and cam 88. Cam 88 cooperates with cam follower 105 to first draw welding head drive slide rod 44 downwardly relative to the base of the welding head, and then to allow the rod to be move upwardly under the bias of spring 75 as roller 105 approaches the end of cam control lobe 110. The contour of cam 88 is defined so that when roller 105 is at the beginning of lobe 110, conductor 116 is moved into contact with terminal pin 122 but the force applied by the electrodes to the terminal pin and the conductor is essentially zero so that insulation material 134 surrounding conductor wire 133 is undeformed. The effective throw of cam 88, i.e., the difference in the radius of the cam from the beginning of lobe 110 to the point of maximum radius of the lobe, is defined with reference to the length of terminal pin 122 between surfaces 130 and 131 and the diameter of conductor wire 133. Specifically, the throw of cam 88 through cam control lobe 110 is slightly greater than the difference between the length of terminal pin 122 and the diameter of conductor 116, on the one hand, and the length of pin 122 and the diameter of conductor wire 133, on the other hand. Also, setscrew 81 in weld head 23 is adjusted so as to cause operation of switch 78 when the pressure applied to the work by electrodes 40 and 58 corresponds to the predetermined welding force value indicated by the applicable weld schedule. Adjusting knob 45 is operated to adjust the bias of spring 51 so that the maximum force applied to the work by the electrodes during rotation of shaft 86 is substantially greater than the predetermined welding force value, and so that pin 66 does not bottom out at the lower extent of bore 65. Thus, during that portion of the rotation of shaft 86 within which cam follower roller 105 traverses cam control lobe 110, drive slide rod 44 is first moved downwardly and then upwardly relative to the base of the welding head to first increase and then decrease the force applied by the electrodes to conductor 116 and terminal pin 122.

The shape of the curve which is produced when electrode force is plotted graphically against time for a full rotation of shaft 86, i.e., curve 77 in FIG. 10, is essentially identical to the curve (not shown) which describes the rate of rise and fall of the cam along cam control lobe 110 relative to the base diameter of the cam, i.e., to the diameter of the cam at the beginning and end of the lobe.

The maximum force applicable by the electrodes to the work is selected so that such force is adequate to produce cold flow of insulating material 134 from between the lower end of electrode 58 and conductor wire 133, and from between the conductor wire and terminal pin 122, thereby to render conductive the path from the upper electrode to the lower electrode through the conductor wire and the terminal pin.

At the time cam 88 begins to rotate following closure of foot switch 100, the contacts of power supply inhibit switch 92 are opened by reason of the profile of cam 90 and do not close until about time cam follower roller 105 reaches the point of maximum radius of cam 88. Since switch 92 is coupled in series with power supply control switch 78, switch 78 is rendered inoperative to trigger a welding pulse to the electrodes during the initial stage of downward travel of the upper electrode. Because the contacts of switch 92 are not closed until the force applied to the work by electrodes 40 and 58 reaches a value exceeding the predetermined welding force value indicated by the position of setscrew 81, no welding pulse can be applied to the electrodes until the force applied to the work by the electrodes falls to the predetermined welding force value on the upstroke of drive slide rod 44.

Because force is applied to conductor 116 and terminal pin 122 on the upstroke of rod 44 up to and through the time of passage of the pulse of welding current through the electrodes, the cold-flowable insulating material surrounding conductor wire 133 cannot reenter the space originally occupied by this material, and the path between the electrodes through the work remains conductive. Thus, as the force applied to the conductor and the terminal pin falls to the predetermined welding force value, the path between the electrodes is still conductive. At the time the applied force reaches the predetermined welding force value to which switch 78 is sensitive, this switch closes (switch 92 having previously been closed) to trigger power supply 30 to fire a pulse of welding current having the intensity and duration indicated by the appropriate weld schedule. The profile of cam 88 is configured so that the pressure applied to the work following firing of the welding pulse is not completely relaxed from the work until current has ceased to flow through the electrodes and the puddle 139 (FIG. 6) of molten metal produced between conductor wire 133 and terminal pin 122 by such current has had an opportunity to solidify.

It is apparent, therefore, that welding machine 20 is effective to produce a weld under precisely the conditions indicated by the weld schedule applicable to the work of interest. These conditions are produced automatically; any action taken by the operator of machine 20 following closure of switch 100 has no effect upon the operation of the machine or the character of the weld produced by the machine. Thus, all that is necessary on the part of the operator is to properly position the circuit board in the gap between electrodes 40 and 58, and to operate foot switch 100.

Once the welding machine has operated to make the weld of conductor 116 to terminal pin 122′, the machine operator then moves the circuit board on work support table 24 to position the terminal 122″ on electrode 40. Such movement of circuit board 121 laterally of hole 25 causes an appropriate amount of conductor 116 to be drawn from supply spool 118 and passed through hollow electrode 58. Once terminal pin 122″ has been properly positioned on the upper end of the lower electrode, switch 100 is again closed by the operator and the machine functions automatically to make the second desired weld, which weld is performed under the same conditions as the first weld and is of strength and quality equal to the first weld. The circuit board is then adjusted to place terminal pin 122‴ in position between the electrodes and the desired weld is made by the machine. In this way, conductor stock 116 is, in effect, stitched by welding to the desired terminal pins of circuit board 121 to define conductor 128, illustrated in FIG. 9. After the last weld associated with conductor 128 has been made, the operator merely moves the circuit boards slightly from the electrodes and cuts conductor 116 adjacent the last terminal pin associated with conductor 128. The operator is then in a position to connect conductors 124–127 to their respective terminal pins merely by repeating the process described above an appropriate number of times. Each weld made to the terminal pins of circuit board 21 is of uniform strength and metallurgical quality.

It has been determined that the shape of curve 77 (see FIG. 10) is important to the successful practice of this invention. It has been determined, relative to operability of the invention rather than the practicality or efficiency thereof, that the rise and fall portions of this curve cannot have too small a slope. Similarly, it has been ascertained that the rise and fall portions of the curve, particularly the fall portion, can have too steep a slope. If the slope of curve 77 in its rise portion, i.e., the portion thereof between the intersection of the F and T coordinates in FIG. 10 and the peak of curve 77, is too steep, insulating material 134 may not have adequate time to respond to the force applied to it and may not flow outwardly from between the lower end of electrode 58 and conductor wire 133 or from between the wire and terminal pin 122, before the pulse of welding current is fired on the upstroke of drive slide rod 44. If the slope of curve 77 along the rise thereof is made too gentle, as by stretching the curve along the time coordinate by reducing the rate of rotation of shaft 86, for example, all that is lost is productive machine and operator time since the number of welds which an operator can make in a given period of time is unnecessarily reduced.

For a given type and thickness of cold-flowable insulating material, experience will rapidly define the upper workable limit of the slope of curve 77 in its rise portion.

It has been found that the best welds are produced by operation of welding machine 20 when the bias of spring 51 is adjusted so that the maximum force applied to the work by electrodes 40 and 58 is sufficient to burnish the metal of conductor wire 133 at the interface of the wire with terminal pin 122. Also, the maximum applied force should not be so high as to appreciably pinch and flatten wire 133 against pin 122. Obviously, an applied force sufficient to cause electrode 58 to sever wire 133 is to be avoided.

Also, if the slope of curve 77 in its fall portion, i.e., the portion of the curve having negative slope, is too gentle (has exceptionally low negative slope), all that is lost is time. However, if the slope of curve 77 is too great, in a negative sense, at the time the pulse of welding current is applied to the electrodes, the welding pulse may not be terminated at the time the loading force of the electrodes upon the work is removed, thereby enabling the conductor wire to separate from the terminal pin before the puddle of molten metal necessary to produce the weld has solidified. Therefore, as a minimum, the time between the instant of firing of the pulse of welding current and the instant at which the force applied by the electrodes to the work is removed must be at least as great as the duration of the welding current pulse and the time required for the weld to solidify.

Figure 7:
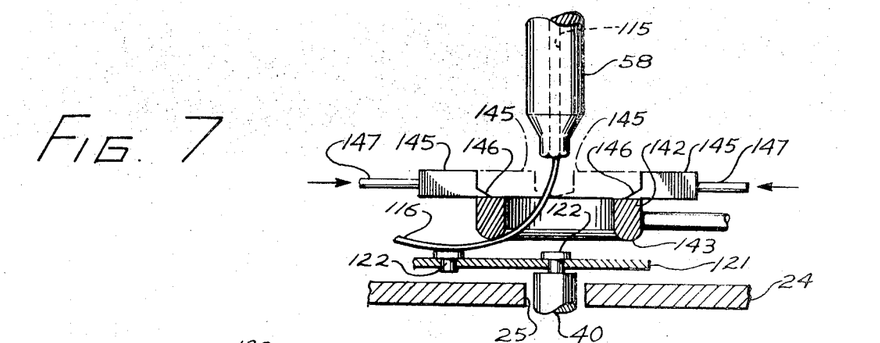
FIG. 7 is a fragmentary cross-sectional elevation view of a portion of the welding machine in another stage of its operation.

FIG. 7 illustrates two accessories which may be used to advantage with the structure of welding machine 20. To cause conductor 116 to lie closely against the upper surface of circuit board 121 during the stitching of conductor 116 to selected ones of terminal pins 122, an annular guide ring 142 is supported above work support table 24 concentric to upper electrode 58. The guide ring is located between the lower end of electrode 58, in its upper (retracted) position, and the upper surface of the circuit board. The inner diameter of ring 142 is sufficiently large that electrode 58 can reciprocate freely toward and away from electrode 40 without interference with the guide ring. The lower surface of the guide ring is smoothly curved convex downwardly at 143 to enable conductor 116 to be drawn smoothly past the ring without causing the ring to tear or otherwise damage the insulation of the conductor. The lower extremity of the ring is disposed sufficiently above table 24 that circuit board 121 may be passed easily under the ring into engagement with the upper end of lower electrode 40. Guide ring 142 is supported above table 24 by a support arm 144 cantilevered from a suitable post or other mounting bracket located either on the table remote from electrode aperture 25, or on the base of the welding machine adjacent the table.

To facilitate cutting conductor 116 at appropriate points during the fabrication of circuit component 120, for example, a pair of cutting blades 145 having cooperating cutting edges 146 are disposed adjacent the gap between electrodes 40 and 58. Each cutting blade is connected to an operating rod 147 which in turn is connected to its own reciprocating mechanism. The cutting blade reciprocating mechanisms preferably are disposed sufficiently far from the electrodes that operator access to the gap between the electrodes is not impaired and so that visual access to the same area is not restricted. The reciprocating mechanisms may be solenoids, for example, operated in tandem by a suitable switch mounted to the structure of welding machine 20. Preferably the lower surfaces of cutting blades 145 are slidably engaged with the upper surfaces of conductor guide ring 142. Upon actuation of the reciprocating mechanisms, the cutter blades move into the position shown in dotted lines in FIG. 7 to sever conductor 116. Preferably the cutting blades are operated following the making of the last weld of a desired length of conductor 116 to a suitable one of terminal pins 122 and before the circuit board is moved laterally of the electrodes following the making of such weld.

It is believed that success in the production of repeatably acceptable welds by the use of the present method and apparatus is dependent upon six variables, namely, (1) the duration of the pulse of welding current applied to the work, (2) the force applied to the work at the time the welding current pulse is applied, (3) the magnitude of the differential of applied force with respect to time ($dF/dt$) at the time the welding pulse current is applied, (4) the sign of $dE/dt$ at the instant of firing of the welding current pulse, (5) the electrode alloy, and (6) the polarity of the welding current pulse. The matters of the magnitude of several of these variables and the effect of variations in the magnitude of such variables have been discussed to some extent above, particularly with reference to welding current pulse duration and the magnitude of the applied force at the time the welding current is applied to the work.

The force applied to the work at the time welding current is applied should be essentially the optimum welding force as defined by the pertinent weld schedule, i.e., the predetermined welding force value as defined above. The criteria which should be considered in defining the weld schedule are set forth in available publications of the RWMA (Resistance Welder Manufacturers Association), as are illustrations of the indicia of too high or too low a value of welding force and the effects of too much or too little current in the applied welding current pulse. Although the present welding method departs radically from RWMA-recommended practice and procedure, RWMA criteria for evaluating welds made by use of the method are generally pertinent. Thus, if the applied force is too high at the time the welding current pulse is triggered by switch 78, the welding current will be spread out over too large an area between wire 133 and pin 122 and an inadequate weld puddle will result. If the applied force is too low at such time, insufficient pressure will exist to contain the weld puddle and the weld will explode. In the practice of the present method, the predetermined welding force value is approximately of the same magnitude as the welding force value indicated by the weld schedule for the same work be welded according to a method consistent with existing RWMA practices and procedures.

The duration of the applied welding current pulse productive of the best welds is normally an item of information given by the pertinent weld schedule. That is, while the weld schedule is plotted in terms of power expressed in units of watt-seconds, best practice concerning weld schedules teaches that once the zone of acceptability has been defined for the work of interest, an optimum pulse duration also is described; once optimum pulse duration has been defined, it is a simple matter to determine the current intensity necessary to produce the appropriate power. In general, however, it may be stated that if the pulse duration is too short, erratic conditions will be manifested at the location of the desired weld because current density is too high. On the other hand, if the pulse duration is too long, insufficient heating of the work may occur with resulting lack of penetration in the weld. A pulse duration in the range of from 1.5 to about 10 milliseconds has been found to produce good results.

Figure 11:
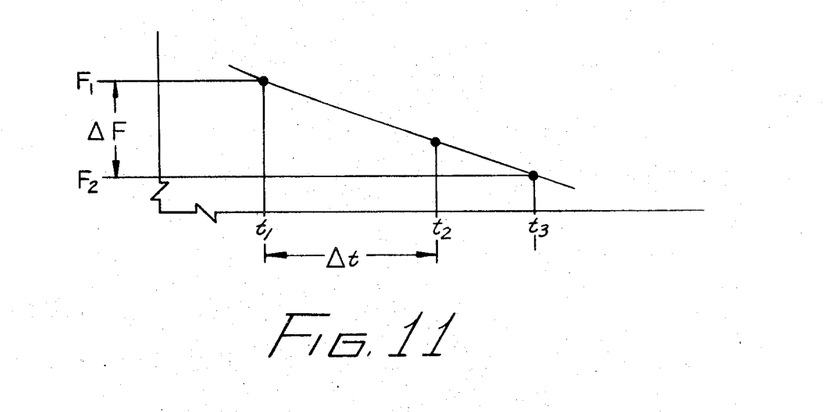
FIG. 11 is an enlargement of a portion of the graphic representation shown in FIG. 10.

The magnitude of $dF/dt$ at the time of firing of the welding pulse has been discussed above in terms of the slope of curve 77 (see FIG. 10). It is recommended that this differential be such that, during the duration of the weld current pulse and solidification of the weld puddle, the applied welding force does not decrease from the predetermined welding force value by more than about 40 percent. Thus, with reference to FIG. 11, if the predetermined welding force ($F_1$) for the work of interest as determined by the pertinent weld schedule is 2 pounds, the applied welding force should not decrease to less than about 1.6 pounds ($F_2$) during both the duration $\Delta t$ of the welding pulse and the time $t_2$ to $t_3$ required for the weld puddle to become solid.

It has been found that the sign of $dF/dt$ at the time of firing of the welding pulse is significant to the quality of the weld produced by welding machine 20. Adherence to RWMA recommendations which teach that the applied welding force be constant or increasing during the duration of the welding pulse, results in welds having approximately 70 percent of the strength of the parent materials constituting the work. It has been found, however, that practice of the present method upon the presently preferred welding machine produces welds having 90 percent or more of the strength of the parent metals constituting the work.

The polarity of the applied welding pulse may vary depending upon the specific work and the particular electrode alloys involved in a particular welding situation. As a general rule, however, it is recommended that the welding current power supply be connected to the welding machine so that the upper electrode is negative with respect to the lower electrode.

RWMA-recommended welding practices and procedures teach that the electrodes generally should show a thermal conductivity opposite to the materials constituting the work of interest. It has been found that the method described above makes it possible to use electrodes having the same characteristics of thermal conductivity as the materials being welded together. It is recommended that the electrodes used in machine 20 have the same or higher value of K (thermal conductivity) as the work of interest. While the specific reasons supporting this recommendation are not fully understood, it is believed that the use of electrodes having higher values of K than the work enables the electrodes to expand and, in effect to physically follow the work during the continuance of the welding pulse and immediately thereafter while the applied welding force is decreasing. That is, the use of electrodes having the same or higher values of K than the work artificially reduces the magnitude of $dF/dt$ otherwise indicated by the profile of cam 88.

Also, the present method makes it possible to use combinations of work material and electrode alloys which were not heretofore successfully usable in resistance welding. One of the presently preferred uses of the present method and apparatus is to weld FEP-insulated nickel wire to stainless steel terminal pins in circuit boards and the like, as illustrated in FIG. 9. RWMA recommendations, at the time the present method was developed, were very clear on the point that stainless steel electrodes could not be used successfully with nickel. RWMA literature very clearly suggested nickel a stainless steel electrode and a nickel workpiece would stick. It has been found that the method described above makes it possible to constitute upper electrode 58 of stainless steel. Series 300, and particularly 302 and 303 stainless steels, have been used to advantage to define electrode 58 in welding machine 20. Further, the electrode and workpiece combinations recommended by the RWMA continue to be useful in the practice of method and apparatus according to this invention. Thus, in the specific instance mentioned above where welding machine 20 is used to weld nickel conductor wire to a stainless steel terminal pin, it is preferred that lower electrode 40 be constituted of RWMA No. 2 electrode material.

While it should be apparent to workers skilled in the art to which this invention pertains that the method and apparatus described above can be used with myriad combinations of workpieces, a presently preferred welding machine has been used successfully to weld Series 300 stainless steel circuit board terminal pins to 28-, 30- or 32-gauge nickel core insulated conductor. The insulation of this conductor is composed of fluoroethylene propylene. Cam 88 is configured and spring 51 is adjusted to produce a maximum applied force (the peak of curve 77) of about 6 pounds. The predetermined welding force value for such work is approximately 2 pounds and the power of the welding current pulse is between 4 and 5 watt-seconds.

It was mentioned above that a Unitek Model 2-032-03 resistance welding head is a suitable commercially available welding head useful as a component of welding machine 20; this welding head is designed to operate under conditions where welding force is constant or increases during continuance of the welding current pulse. Unitek Corporation recommends that the optimum inertia of the upper electrode horn be on the order of 2 ounces. It has been found that best results are obtained in welding machine 20 when the above-mentioned Unitek welding head is modified to manifest 3 ounces of upper electrode horn inertia. It is believed that this increase in horn inertia makes it possible for the upper electrode to better follow and conform to the work during the actual formation of the desired weld as the applied welding force decreases.

A Unitek Model 2-032-03 welding head is essentially a pressure-sensitive welding head. In such a welding head, the switch affixed to switch mounting lug 55 is a normally open switch which is coupled directly between the power supply and the electrodes and is effective to trigger the firing of a welding pulse upon closure. Because of this arrangement of the switch in the conventional Unitek resistance welding head, it is clear that these welding heads are designed for use in situations where welding force remains constant or increases following closure of the switch. If the case were otherwise, opening of the switch during the continuation of the welding pulse would interrupt the flow of welding power to the electrodes. Because a conventional welding head is constructed to produce firing of the welding pulse during a downstroke of the upper electrode relative to the work, the desired weld is completed before the welding machine operator can manually drive the welding head drive slide downward to a point corresponding to the peak of curve 77; even if the welding head is operated to a point corresponding to the peak of curve 77, such operation is not troublesome because the weld has already been completed. For these reasons, it is not important when the welding current pulse is triggered in a conventional welding machine where such triggering occurs on the downstroke of the upper electrode, nor is the maximum force applied to the work by the electrodes particularly important.

Welding machine 20, on the other hand, is a stroke-sensitive device in which displacement rather than applied welding force, is the primary factor of concern. Since the throw defined by control cam lobe 110 is translatable directly into displacement of drive slide 38 relative to welding head base 35, the throw of the control cam lobe must be determined with respect to the dimensions of the pertinent work and the maximum force which is to be applied by the upper electrode to the work at the peak of curve 77. The value of the applied force at the peak of curve 77 is dependent upon the deflection of spring 51, such deflection again being translatable into displacement. The maximum extent to which spring 51 is deflected is in turn dependent upon the length of terminal pin 122 and the thickness of conductor wire 133. Too high a maximum value of applied welding force can cause conductor 116 to be severed. Thus, the maximum force applied to the work by the welding electrodes in the practice of the present method becomes a factor of considerable importance.

Also, in welding machine 20 the weld current pulse is triggered on the upstroke of the upper electrode. It is important, therefore, that the point at which the welding current pulse is triggered be controlled within relatively narrow limits within the range of displacement of the upper electrode to assure that the upper electrode does not separate from the work before the weld current pulse has ended and the weld puddle has solidified. Maximum applied force and pulse triggering are related to the stroke of drive slide rod 44, to the bias of spring 51, to the diameter of conductor wire 133, and to the length of terminal pin 122. The stroke of rod 44 and the bias of spring 51 are constants for any given setup of machine 20; the knob by which spring 51 is adjusted is within housing 22 and is not readily accessible. Therefore, the diameter of wire 133 and the length of pins 122, as a practical matter, are the principal variables to control to assure repeatability of the welds produced by welding machine 20. Since the diameter of conductor wire 133 will not vary significantly in any given use of the machine, the length of terminal pins 122 remains the only real dimensional variable the value of which must be controlled to obtain repeatable welds. It is for this reason that all terminal pins carried by circuit board 121 should be of uniform length.

The invention has been described above with reference to specific procedures and examples which have been presented for the purposes of setting forth presently preferred embodiments of the invention. Workers skilled in the art to which the invention pertains will most likely, and quite readily, observe that modifications and alterations to the above-described procedures and structures can be made to suit specific problems faced by them without departing from the scope and spirit of the invention. Therefore, the foregoing description should not be regarded as limiting or defining the precise scope of the invention.

What is claimed is:

1. The method of forming, by welding, a conductive mechanical connection between a conductor surrounded by a pressure-deformable insulating material and a desired conductive element comprising the steps of
   a. contacting the insulated conductor and the element sufficiently forcefully to produce cold flow of the insulating material from between the conductor and the element, the force of contact being greater than a predetermined welding force value,
   b. decreasing the force of contact of the conductor with the element substantially directly to the predetermined welding force value, and
   c. forming a weld between the conductor and the element when the predetermined welding force value is achieved.

2. The method according to claim 1 wherein the contacting step is performed by engaging the insulated conductor and the conductive element between a pair of welding electrodes, and by moving the electrodes together.

3. The method according to claim 2 wherein production of said cold flow creates an area of contact between the conductor and the element and the weld is formed by passing welding current between the electrodes through said area of contact.

4. The method of claim 3 including the step of further decreasing the force of contact of the conductor with the element during passage of welding current through said area of contact.

5. The method of claim 4 wherein the step of further decreasing the force of contact is continued until after welding current has ceased to pass through said area.

6. The method according to claim 2 including supplying the insulated conductor to the conductive element through one of the electrodes.

7. The method according to claim 1 including the step of further decreasing the force of contact of the conductor with the element during formation of the weld.

8. The method according to claim 7 wherein the step of further decreasing the force of contact is performed in such a manner that the force of contact at the completion of formation of the weld is not more than about 40 percent of the predetermined welding force value.

9. The method according to claim 1 including limiting the force of contact between the conductor and the element to a force which is insufficient to produce appreciable deformation of the conductor.

10. The method of forming a conductive mechanical connection between a conductor surrounded by a pressure-deformable insulating material and a desired conductive element comprising the steps of
   a. contacting the insulated conductor and the element, under the influence of a bias force which has a value sufficient to produce cold flow of the insulating material from between the conductor and the element to create an area of physical contact between the conductor and the element,
   b. decreasing the bias force from the value thereof productive of said area of physical contact to a selected lower force value, and
   c. forming a bond between the conductor and the element in said area of physical contact when the selected lower force value is achieved.

11. The method of welding an elongate insulated conductor to a plurality of nonconductively interconnected conductive elements at a corresponding plurality of locations spaced along the conductor, the conductor being surrounded along its length by a pressure-deformable insulating material, the method comprising the steps of
   a. disposing the first of the conductive elements upon the work engaging end of one of a pair of adjacent relatively movable welding electrodes,
   b. supplying the insulated conductor to the first element along the other electrode from a supply of the conductor,
   c. moving the electrodes together to engage the conductor and the element between the electrodes with a force which is greater than a predetermined welding force value appropriate to the element and the conductor and is sufficient to produce cold flow of the insulating material to establish a conductive path between the electrodes via the conductor and the first element, d. decreasing the force applied by the electrodes to the conductor and the first element to the predetermined welding force value, e. passing a welding current along the conductive path when the predetermined welding force value has been obtained to weld the conductor to the first element, f. moving the interconnected conductive elements relative to the electrodes to position the second conductive element on the one electrode and supplying the conductor along the other electrode during such movement sufficiently to accommodate such movement, and g. repeating steps (a) through (f) a sufficient number of times to weld the conductor to the second and further remaining elements of said plurality thereof.

12. The method of claim 1, further including the step of varying the force of contact of the conductor with the element during formation of the weld.

13. The method of claim 3, further including the step of varying the force of contact of the conductor with the element during passage of welding current through said area of contact.

14. The method of claim 13, wherein the step of further varying the force of contact is contained until after welding current has ceased to pass through said area.

15. The method of claim 1, wherein the steps of contacting and decreasing are performed serially in such manner that, throughout the interval commencing with cold flow of the insulating material and ending with commencement of the forming step, a force exists between the conductor and the element.

16. The method of forming, by welding, a conductive mechanical connection between a conductor surrounded by a pressure-deformable material and a conductive element secured through an insulated circuit board or the like, the conductive element having opposing ends on opposite sides of the board, the method comprising the steps of:

a. contacting the insulated conductor and one end of the element sufficiently forcefully to produce cold flow of the insulating material from the conductor and the element one end, the force of contact being greater than a predetermined welding force;

b. decreasing the force of contact of the conductor with the element to the predetermined welding force value; and c. providing a weld potential between the insulated conductor and the other end of the element when the predetermined welding force value is achieved.

17. The method of claim 16, wherein the contacting step comprises:

a. positioning the insulated conductor between the one end of the element and one of a pair of welding electrodes;

b. engaging the other end of the element with the other welding electrode; and c. moving the electrodes toward each other.

18. The method according to claim 17, further including the step of supplying the insulated conductor to the conductive element through one of the electrodes.

19. The method according to claim 17, wherein the providing step comprises applying a weld potential between one pair of electrodes when the predetermined welding force is achieved.

* * * * *

PO-1050
(5/69)

UNITED STATES PATENT OFFICE
CERTIFICATE OF CORRECTION

Patent No. 3,627,970     Dated   December 14, 1971

Inventor(s) John F. Weatherman, Gary J. Walker and Larry R. Conley

It is certified that error appears in the above-identified patent and that said Letters Patent are hereby corrected as shown below:

Column 1, line 17, for "components" (first occurrence) read --circuit--;
         line 68, for "an" read --a--.
Column 3, line 1, for "the" read --to--;
         line 16, for "the work" read --"the work"--;
         line 24, for "the work" read --"the work"--.
Column 6, line 35, for "force" read --contacts--.
Column 9, line 3, for "electrode" read --electrodes--.
Column 10, line 39, after "about" read --the--;
         line 43, for "stage" read --stages--.
Column 12, line 8, after "weld" read --puddle--;
         line 63, for "dE/dt" read --dF/dt--.
Column 14, line 22, for "nickel" read --that--.
Column 17, line 23, for "contained" read --continued--.
Column 18, line 27, for "one" read --the--.

Signed and sealed this 1st day of August 1972.

(SEAL)
Attest:

EDWARD M. FLETCHER, JR.     ROBERT GOTTSCHALK
Attesting Officer            Commissioner of Patents